United States Patent [19]

Nascher

[11] Patent Number: 4,658,680

[45] Date of Patent: Apr. 21, 1987

[54] OPERATING A LATHE

[75] Inventor: Fred Nascher, 10819 Rochester Ave., Los Angeles, Calif. 90024

[73] Assignee: Fred Nascher, Los Angeles, Calif.

[21] Appl. No.: 420,201

[22] Filed: Sep. 20, 1982

Related U.S. Application Data

[63] Continuation-in-part of Ser. No. 181,738, Aug. 26, 1980, abandoned.

[51] Int. Cl.⁴ .......................... B23B 1/00; B23B 31/00
[52] U.S. Cl. ...................................... 82/1 C; 82/34 R; 82/40 R; 82/45; 269/156; 269/283; 279/1 SJ; 279/110; 279/123
[58] Field of Search ................ 82/1 R, 1 C, 45, 34 R, 82/40 R; 279/1 R, 1 A, 1 L, 1 ME, 1 SJ, 110, 123; 269/156, 283

[56] References Cited

U.S. PATENT DOCUMENTS

| 917,387 | 4/1909 | Webb et al. | 279/1 SJ |
|---|---|---|---|
| 1,399,194 | 12/1921 | Cole | 279/110 |
| 2,686,058 | 10/1954 | Zetterberg | 279/123 |
| 2,757,008 | 7/1956 | Lane | 279/123 |
| 3,032,347 | 5/1962 | Cambron | 279/110 |
| 3,199,881 | 8/1965 | Duxbury | 279/123 |
| 3,413,010 | 11/1968 | Buck | 279/123 |
| 3,575,435 | 4/1971 | Lemanski | 279/123 |
| 4,045,039 | 8/1977 | Pope et al. | 279/123 |
| 4,254,676 | 10/1981 | Wilson | 82/34 R |

FOREIGN PATENT DOCUMENTS 2839320  3/1980  Fed. Rep. of Germany ...... 279/1 C

OTHER PUBLICATIONS

American Machinist Magazine, Aug. 14, 1947, p. 127, Practical Ideas–Chuck Shoe.

Primary Examiner—Nicholas P. Godici
Assistant Examiner—Jerry Kearns
Attorney, Agent, or Firm—Ralf H. Siegemund

[57] ABSTRACT

A three-jaw chuck of a lathe is adapted to rectangular or square-shaped work pieces by a U-shaped adaptor placed on one of the jaws. The adaptor may be adjustable as to the distance between the jaw tip and the support surface for the workpiece. Alternatively, a set of adaptors of differing thickness can be provided for purpose of selection on a case-by-case basis.

7 Claims, 8 Drawing Figures

U.S. Patent     Apr. 21, 1987     4,658,680
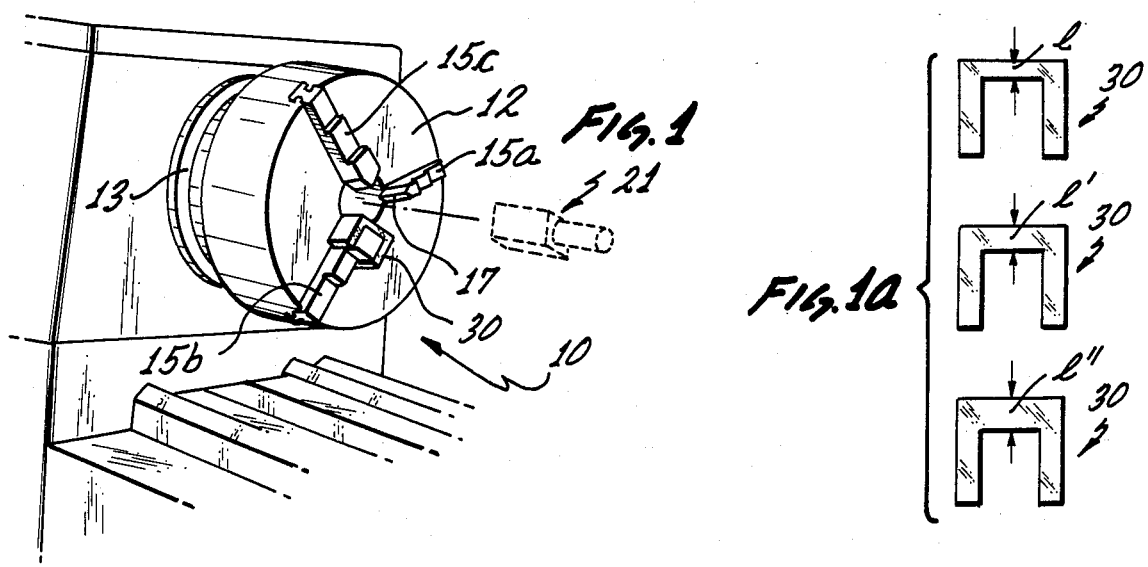
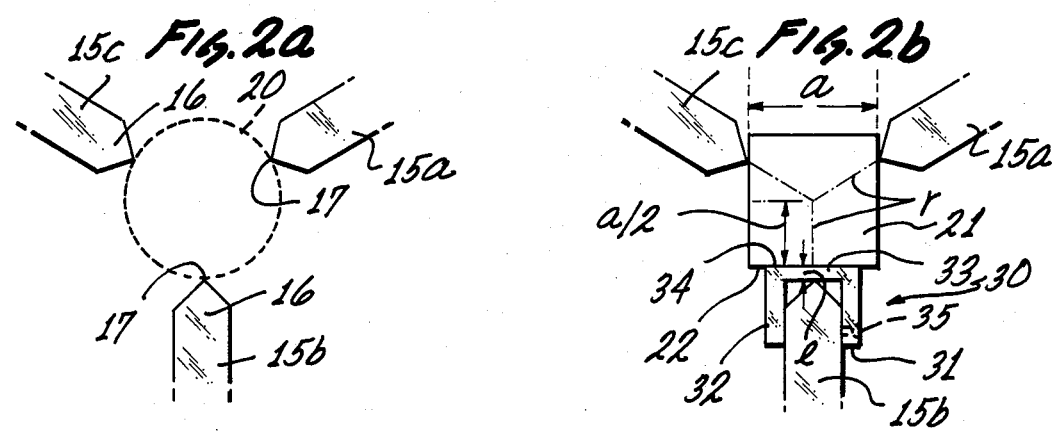
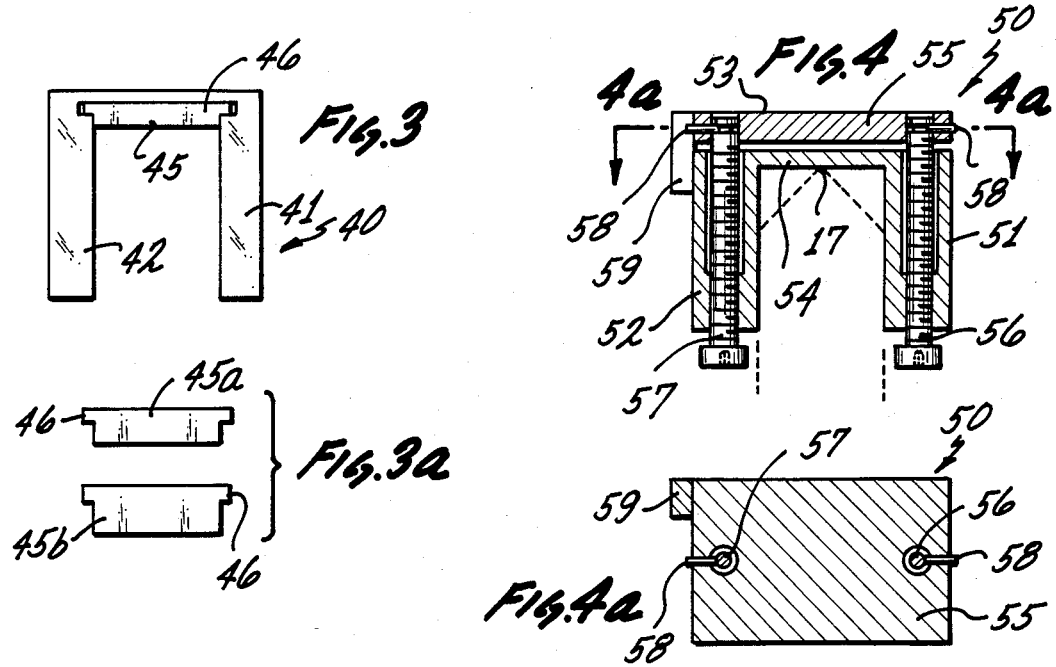

OPERATING A LATHE

This application is a continuation-in-part of Ser. No. 181,738, filed Aug. 26, 1980 and now abandoned.

BACKGROUND OF THE INVENTION

The present invention relates to a method of operating a lathe and to supplemental equipment for that purpose.

A conventional lathe includes a headstock an a tailstock for holding a workpiece during, e.g., cutting; and the headstock is usually constructed to hold a chuck. A conventional chuck for a lathe inlcues a, usually, cylindrical body to be secured to the drive flange of the lathe. The chuck elements or jaws are mounted to the chuck body for clamping one end of the workpiece in particular relation to the axis of rotation.

The most commonly used chuck includes three jaws which are mounted to the chuck body for adjustment along three radial lines spaced by a 120°. A helical groove at the bottom of the chuck induces the jaws to undergo simultaneous motion so that the tips will always make a true circle. Each jaw has a tapered front end which points towards the common center of the three jaws. The front end is rounded or flat, but quite thin. These three tapered front ends engage a round workpiece in three, almost line-shaped surface portions and, thus, provide a mathematically three-point support (in any plane transversely to the axis of rotation) for the workpieces, the clamping forces being directed radially towards the common center through the axis of rotation of the lathe.

Another kind of chuck is used for rectangular-or square-shaped workpieces. This chuck includes four jaws, arranged in pairs, whereby the jaws of one pair are adjustable to each other along a first line through the axis of roatation, and the jaws of the second pair are also adjustable to each other along a line that is orthogonal to the first one as well as to the axis, and traverses the point of intersection of this axis and of the first-mentioned line.

It is, thus, apparent that if a lathe is to be used for both kinds of workpieces (round and rectangular), both kinds of chucks are needed. Aside from the fact that chucks are expensive, one has to exchange one for the other in between workings. U.S. Pat. No. 2,757,008 discloses an elaborate system for reconstructing the jaws of a three-jaw chuck, converting the system, in effect, into an arrangement of three master jaws, each supporting a modified jaw structure. This multiple component structure does not permit adaptation of a standard jaw structure.

DESCRIPTION OF THE INVENTION

It is an object of the present invention to obviate the need for a four-jaw chuck in a lathe.

It is, therefore, a particular object of the present invention to improve lathe operation in that a three-jaw chuck can be used for working rectangular and square-shaped workpieces.

It is a specific object of the present invention to provide supplemental equipment for a three-jaw chuck to permit its use for changing a rectangular- or square-shaped workpiece.

In accordance with the preferred embodiment of the present invention, it is suggested to provide a U-shaped adapter element having a flat bottom surface, being the bottom of the U, and to place that element over one of the jaws, this jaw to be received between the legs of the U; the flat bottom surface of the adapter faces the rotational center along a radial line being normal to that surface. A rectangular- or square-shaped workpiece can now be clamped to the chuck in that one flat surface of the work sits on the bottom surface of the adapter, and the two other jaw elements engage respectively the two sides of that workpiece; the two sides extend at right angles from the first-mentioned, flat workpiece surface. Regular jaws will engage these sides of the workpiece by means of taper surfaces; sufficient clamping is provided because the clamping forces of these two jaws have components which are directed toward each other.

In the general sense, the bottom of the U of the adapter is adjustable or selective with respect to its thickness, for the selection of a particular distance between the tip of this particular jaw and the work-engaging surface of the adapter. This selection and adjustment can be carried out in a variety of ways, as will be explained with reference to the drawings.

The preferred embodiment of the invention, the objects and features of the invention, and further objects, features and advantages thereof, will be better understood from the following description taken in connection with the accompanying drawings.

DESCRIPTION OF THE DRAWINGS

FIG. 1 is a perspective view of a three-jaw chuck with an adapter in accordance with the preferred embodiment of the invention;

FIG. 1a shows a set of adapters for use on the chuck shown in FIG. 1;

FIGS. 2a and 2b are schematic graphs for explaining the geometry involved;

FIG. 3 is a side view of an adjustable adapter element;

FIG. 3a shows a set of adaptation supplements for the particular adapter shown in FIG. 3;

FIG. 4 is a side view of another type of adjustable adapter; and

FIG. 4a is a section view, as indicate by lines 4a—4a in FIG. 4.

Proceeding now to the detailed description of the drawings, FIG. 1 illustrates a lathe 10 having a three-jaw chuck 11. This chuck includes a body 12 which is secured to a driving flange 13, or the like, of the lathe. The three jaws 15 are designated individually as 15a, 15b, and 15c. These jaws each have a tapered front end 16 with a rounded tip 17. The jaws 15 are radially adjustable in body 12, there being suitable grooves in this body for establishing three adjustment beds. All of these parts are conventional. It is, in effect, an essential feature of the invention that this chuck construction is, indeed, not only conventional but readily awailable and widely used because the invention seeks to adapt existing three-jaw chucks, not to modify them structurally.

Normally, the chuck is provided for clamping a round workpiece such as 20 (FIG. 2a), in that the tips of the three chuck elements engage that workpieces along radial lines, acting normal to the surface at the points of engagement. This three-jaw chuck is now adapted to the working of rectangular- or square-shaped workpiece 21.

The adapter 30 is of a U-shaped configuration, the "U" having two legs 31 and 32, and a cross-portion 33, whose bottom surface 34 is the surface for engaging one flat side 22 of the workpiece 21. As shown in FIG. 2b, the adapter simply sits on one of the jaws and receives it between the legs 31 and 32. The tip of this jaw, 15b, engages the bottom part 33 from the inside. As far as the other two jaws, 15a and 15c, are concerned, the following observation is to be made. Generally speaking, these jaws will directly engage the workpiece by means of some point or surface. The point of engagement may be the tip, or the edge, or corner, where one of the taper surfaces ends. However, the following geometry should be observed. Standard jaws have a taper angle of 120°. Since the jaws are distributed around the axis of the lathe at a regular spacing (120°), respective two taper surfaces, one per jaw, extend parallel to each other and also parallel to a center line of the respective third jaw. Therefore, one taper surface of each of the jaws 15a and 15c engages the rectangular workpiece 21 in face-to-face contact.

Reference numeral 35 refers to a simple set screw by means of which the adapter is clamped to the jaw. This is not essential because during rotation of the chuck, the adapter is necessarily forced radially outwardly by operation of the centrifugal force which forces the adapter against the top 17 of the jaw. The fastening screw 25 is simply provided to prevent the adapter, during work preparation, when the lathe does not yet run, from falling off. Also, the adapter 30 may be placed on any of the jaws in any position thereof; upon fastening, it will be retained even when the chuck does not rotate.

FIG. 2b reveals that the thickness of the bottom portion 33 of the adapter 30 establishes a particular geometry. The chuck is constructed in such a way that the tips of the jaws have always the same distance r from the center and axis of rotation of the lathe. That axis of the lathe will coincide with the center axis of the workpiece only when the tips of jaws 15a and 15c both engage sides of workpiece while having a distance r from that center c, wherein r is the sum of the thickness l and of half the dimension a of the square-shaped workpiece. Moreover, the relation must be true that $$a/2 = r \cdot \cos 30° = (a/2 + l) \cdot \cos 30°,$$

which gives directly the relation between the workpiece dimension, here side length a, and the operative adapter thickness l. Thus, this adapter fits only one square-shaped workpiece, but also a plurality of rectangular workpieces.

In view of the extreme simplicity of the adapter, one can simply provide a large set of them, each one with a different bottom thickness. The selection or selectivity of the adaptation is, thus, reduced here to the selection of the most suitable adapter among those in the set. FIG. 1a shows representatively several members 30, 30', 30'', and so forth, differing in thickness l(l', l'') of the bottom. The members 30, 30', 30'' should be labeled, to indicate the dimensions of the workpieces for which they are respectively used.

FIG. 3 illustrates a first example for a different type of adapter. The U-shaped adapter 40, having legs 41 and 42, has a relatively thin bottom 43. Adaptation pieces 45 (45a, 45b, and so forth) can be inserted in between the legs, simply by placing the edges 46 into grooves of the legs 41 and 42. The adaptation pieces have different thicknesses and augment the thickness of bottom 43 in order to obtain the requisite, resultant thickness for a particular workpiece.

FIG. 4 illustrates another example for an adjustable adapter, denoted here by numeral 50. The bottom 53 is composed of a carrier 54 from which the legs 51 and 52 extend. Fastened to that carrier 54 is a plate 55. In particular, screws 56 and 57 are threadedly received in legs 51 and 52, but their tips can turn freely in unthreaded bores in plate 55. The screws have keying grooves at their respective tip to be retained by means of pins 58. Screws 56 and 57 can, thus, turn in the plate and, as they are threaded farther into legs 51 and 52, they lift plate 55 off the carrier part 54 to, thereby, adjust the effective distance l between the chuck jaw top 17 and the support plate form 59 for the workpiece. A flat pointer 59 extends down and along one leg, e.g. leg 52, the latter being provided with a scale, so that the user can read directly the dimensions of the workpiece as he adjusts the level of plate 55.

This adapter is, of course, of a somewhat more complicated construction, but offers the advantage that the adaptation is not limited to fixed and particular workpiece dimensions.

The legs of the various adapters are provided primarily for positioning of the support surface and, due to the requirement of symmetry, these positioning legs, together with the adapter bottom, establish the U. The legs should be sufficiently thick in the case shown in FIG. 4 so that the screws 56 and 57 can be firmly supported. They also broaden the basic support surface of the adapters in any of the examples.

From the examples above, it can be seen that the square-shaped or rectangular workpiece is centered. The lathe axis will run through a plane of symmetry between the sides engaged by the two jaws which are not covered by the adapter, while the radial center line of the jaw covered by the adapter is on line with the center of the workpiece. In some cases, this may not be needed or even be wanted; here then, one may place a second adapter on another one of the jaws to, thereby, shift the workpiece laterally.

The invention is not limited to the embodiments described above; but all changes and modifications thereof, not constituting departures from the spirit and scope of the invention, are intended to be included.

I claim:

1. A method of operating a lathe, having a regular three-jaw chuck, the jaws being of the usual pointed center tip configuration, comprising the steps of:

placing a U-shaped adapter onto just one of the jaws, so that a flat bottom surface of the adapter faces the center of the chuck; and clamping a rectangular or square-shaped workpiece between said flat bottom surface and the uncovered other two jaws directly, whereby the flat bottom surface is in surface-to-surface engagement with one flat surface of the workpiece, so that the lathe axis will run in and through a plane of symmetry which plane extends between other, parallel surfaces of non-adjoining sides of the workpiece, which latter surfaces are engaged by the uncovered jaws.

2. The method as in claim 1, and being preceded by the step of selecting a particular adapter from among a plurality of adapters having different bottom thicknesses.

3. The method as in claim 1, and including the step of adjusting the thickness of the bottom of the adapter to, thereby, adjust the distance of the flat bottom surface that engages the workpiece and the tip of the jaw onto which the adapter is placed.

4. The method as in claim 3, the adjusting step including the step of adapting the bottom thickness of the adapter.

5. The method as in claim 4, the adapting step including the step of selecting an adaptation piece from a plurality of such pieces.

6. The method as in claim 3, the adapter having a two-part bottom, the adjusting step including adjusting the spacing between the parts of the bottom.

7. The method as in claim 1, and including the step of fastening the adapter to the jaw.

* * * * *